Sept. 30, 1947.   R. C. ZEIDLER   2,428,134
FLUID COUPLING
Filed April 26, 1945

Inventor:
Reinhold C. Zeidler

Patented Sept. 30, 1947

2,428,134

UNITED STATES PATENT OFFICE 2,428,134

FLUID COUPLING

Reinhold C. Zeidler, Detroit, Mich., assignor to Borg-Warner Corporation, Chicago, Ill., a corporation of Illinois Application April 26, 1945, Serial No. 590,350

9 Claims. (Cl. 103—115)

This invention relates to hydraulic couplings of the vaned type. The improvements have specific reference to the construction of and mounting means for the vanes of the coupling, provision being made for flexing the vanes.

The present application is a continuation in part of the application of Reinhold C. Zeidler, Serial Number 387,019, filed April 5, 1941, for a "Fluid coupling," which matured in Patent No. 2,378,353, dated June 12, 1945.

It is a principal object of this invention to provide an improved fluid coupling of light weight and less expensive to produce than prior couplings, and which inherently acts with a mechanical shock absorbing function that is effective for eliminating vibration and shocks especially during low slip conditions.

A specific object of this invention is to provide a fluid coupling wherein the vanes are free of the housing which defines the hydraulic circuit so that the vanes are able to move relatively thereto in such regions.

Another object of this invention is to provide a simplified mounting arrangement for the vanes so as to make it unnecessary to use elaborate and expensive special welding equipment.

A still further object of this invention is to provide a vane that is a simple metal stamping that is flexible when mounted and has a portion of a core ring extruded therefrom.

Another object of this invention is to provide a vane for fluid couplings that is flexible when mounted on a rotatable hub member, and embodies a metal stamping having a core ring section extruded centrally therefrom. Thus there is a flexing region of the vane radially inward of the core ring in a plane between the core ring section and the terminals of a lateral flange at the radially inward edges of the stamping. Also there is another flexing region in the vane radially outward from the core ring. By reason of the present arrangement one portion of a vane flange serves as a means for mounting the vane on the hub and another portion of the vane flange serves as a baffle.

Figure 1:
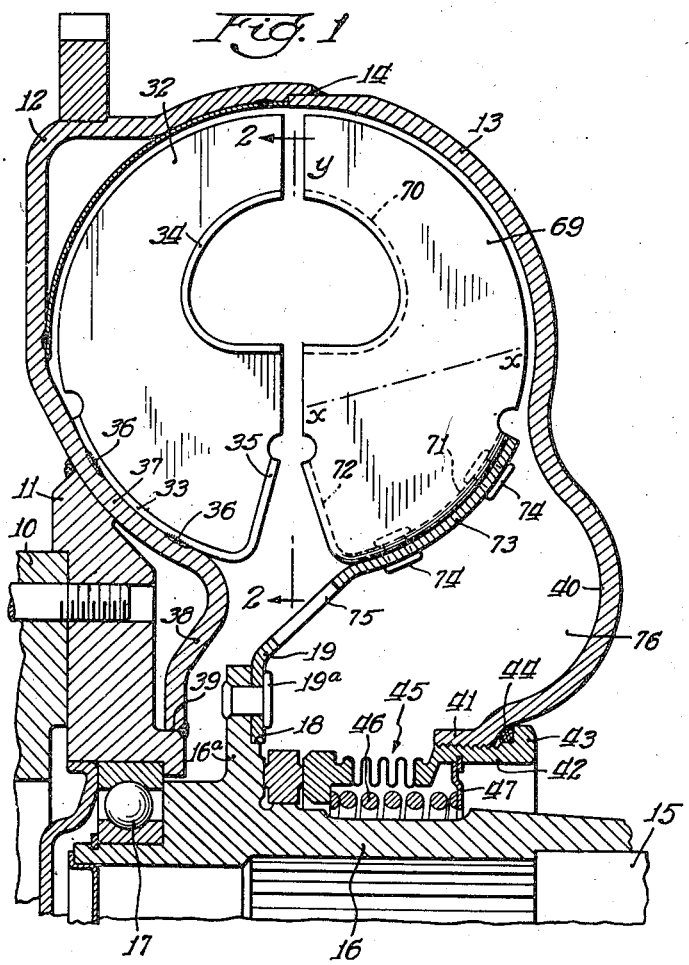
Figure 2:
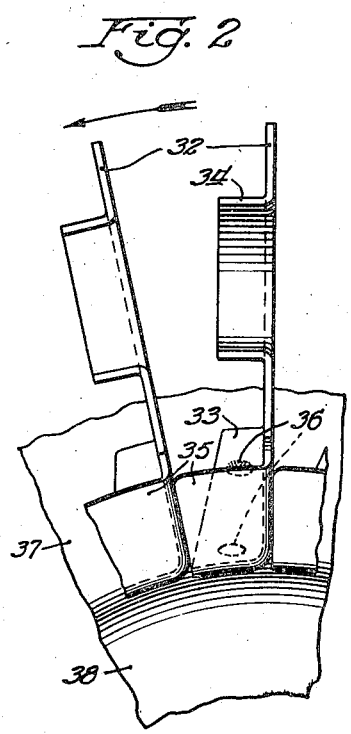

These and other objects and features of this invention will become apparent from the following description when taken together with the accompanying drawings, in which:

Fig. 1 is a fragmentary side elevation, partly in section, of a fluid coupling showing the instrumentalities of tis invention; and Fig. 2 is a vertical edge view along the plane of line 2—2, Fig. 1 showing several vane members.

The drawings are to be understood as being more or less of a schematic character for the purpose of disclosing a typical or preferred form of the improvements contemplated herein. In these drawings like reference characters identify the same parts in the different views.

The assembly herein described is particularly adapted for installation in a motor vehicle, but it will be understood that it is capable of use in other arrangements where driving and driven members are coupled.

Referring now to a detailed description of the invention, 10 is a drive shaft to which is bolted a casting 11 which is welded to a stamped housing 12. A second stamping 13 having the form shown in Fig. 1 is welded at 14 to stamping 12 to form a fluid-tight housing for the fluid coupling. Said housing defines a substantially toroidal container.

A driven shaft 15 extends into the housing formed by stampings 12, 13 and supports a hub member 16 at the forward or inner end thereof, said hub being splined to the shaft so as to form a driving connection with the latter. Hub member 16 is in turn supported from casting 11 by means of a bearing 17.

The hub member 16 has an annular radially extending flange portion 16a which is shouldered at 18 as shown, to receive a flared annular member 19 riveted thereto as at 19a and having an arcuate portion 73 which serves as a concave seat. The hub assembly, which includes the flange 16a, flared member 19, and seat 73, is designed so as to possess sufficient rigidity to transmit the necessary torque without distortion, thus providing suitable means for maintaining the vanes 69 drivingly associated with the hub.

These vanes 69 preferably comprise flexible metal stampings having the shape shown in Fig. 1. It will be observed that a vane is of substantially semi-circular shape and has an integrally formed core ring section 70 that is effective to assist in establishing the toroidal circuit in the fluid. There is a lateral flange 71 formed along the radially inward portion of the curved periphery of the vane 69, and said flange continues radially outwardly into the hydraulic circuit to form a baffle 72 along the straight margin of the vane. Flange portion 71 conforms to and is a counterpart of concave seat 73 in which it is secured by rivets 74, welding or otherwise. It will be noted that vane 69 is flexible and that the flexibility may be controlled by choosing the proper length and size of flange 71. As shown in the present instance, the vane is flexible in the region between core ring 70 and the outer edges or terminals of baffle 72 and flange 71, as for example, in the region along the plane of line x—x. The radially outer region y of the vane beyond the core ring 70 also is flexible to a limited extent.

The driving vanes 32, which may be exact duplicates of driven vanes 69, have curved lateral flanges 33 along their arcuate edges, which flanges are continued along the straight edges toward core ring section 34 to provide baffles 35. The curved flange portions 33 are secured by welding 36 in the concave seat 37 that is formed in the adjacent portion of housing member 12. The radially inward portion 38 of housing member 12 extends to a shoulder 39 on casting 11 to which it is welded.

Stamping 13 has a bulged radially inward portion 40 terminating in a hollow cylindrical hub 41 surrounding and spaced from hub 16 and driven shaft 15, said hub having internal threads to receive an externally threaded sleeve nut 42. Flange 43 of this nut 42 compresses a packing washer 44 against the outer portion of housing hub 41, and the inner edge of said nut serves as an abutment for a bellows type seal 45 interposed between it and the hub flange 16a. A helical spring 46 between the seal 45 and a washer 47 on the sleeve nut yieldingly urges the members of the seal against the hub flange 16a.

The vane support shown is less expensive than other types of supports, since it is comprised entirely of readily fabricated members. The length of the flanges 33 and 71 extending along the arcuate margins of the vanes may be chosen to expose a greater or lesser amount of flat region for any degree of flexibility desired in the vanes. The part of the vane flange, along the straight edge of the vane, which extends into the hydraulic circuit may serve as a baffle to prevent the formation of shallow high velocity vortex circuits during high slip periods. It will be noted that the circuit-defining core ring sections do not extend to the adjacent vane. This permits each vane to flex individually and independently of its adjacent vanes. By making the wall of the core ring section smaller than the distance between vanes, a slotted core ring construction is secured which increases the efficiency of the coupling under certain conditions.

The construction herein described possesses a number of advantages which improve both the efficiency and the operating characteristics of the coupling. By making both the driving and driven vanes entirely free of the housing in the working circuit and permitting the vanes to flex outside the working circuit, a vibration dampening effect is secured. This effect is available when the coupling is installed in a motor vehicle and the car is coasting against the engine as well as when the engine is driving. The elimination of a separate shell for the driven vanes increases the diameter of the permissible hydraulic working circuit without increasing the outside diameter of the housing. This results in a greater capacity for a given size of coupling. The elimination of the driven vane shell practically eliminates axial thrust on the driven hub and simplifies the bearing construction. Furthermore, the absence of a shell eliminates the problem of returning to the circuit, fluid which had escaped to the outside of the shell, into the reservoir commonly used for this purpose. One or more apertures 75 are made in the flared portion of annular member 19 to provide communication between the vaned regions of the torus and the annular chamber 76 formed by the bulged region 40 of housing section 13.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. In a hydraulic torque transmitting device a rotary element having a plurality of vanes drivingly associated therewith, a portion of each of said vanes being movable relatively to another portion, said vanes each having a portion of a core ring extended therefrom, the farthest edge of each ring portion being spaced from the next adjacent vane to permit such relative movement between vanes, and each vane having means formed thereon cooperating with said rotary element and for serving as a baffle.

2. In a hydraulic torque transmitting device a radially extending flange; and a vane secured to said flange, said vane comprising a stamping having integrally formed therewith a section of a core ring and a flange extending around the radially inner edge of the vane and then outwardly toward the core ring, the first portion of the vane flange serving as a means for securing the vane to the first-mentioned radially extending flange, and the second portion of the vane flange serving as a baffle.

3. In a hydraulic transmission device a rotary hub member having a radially extending flange, said flange having a lateral portion of arcuate cross-section serving as a a seat; a plurality of vanes drivingly associated with said rotary member, each vane comprising a metal stamping having a section of a core ring integrally formed therewith, a portion of each vane being movable relatively to another portion, each vane having a flange extending around the radially inner edge of the stamping and then outwardly toward said core ring, the first portion of said vane flange being shaped to conform to the cross-section of said seat and being anchored thereto, and the second portion of said vane flange serving as a baffle; the flexible portion of the vane being located in the region of the stamping between said core ring and the terminals of said vane flange.

4. In a hydraulic transmission device a toroidal housing, a rotary member in said housing having a radially outward extending seat; and a vane secured to said seat, said vane comprising a stamping having an edge flange one portion of which conforms with and is anchored to said seat, another portion of said flange extending radially outward towards the center of the torus and serving as a baffle.

5. A hydraulic transmission device as defined in claim 4 wherein the vane has a flexible region radially outward beyond the terminals of the respective flange portions.

6. A hydraulic transmission device as defined in claim 4 wherein the vane has a section of a core ring formed integrally therewith and there is a flexible portion between said core ring section and the radially outward terminals of the respective flange portions.

7. In a hydraulic transmission device a toroidal housing; a rotary member in said housing; and a vane having driving connection with said rotary member, said vane comprising a stamping having a section of a core ring formed integrally therewith, said vane having flexible regions which are located radially outward and radially inward of said core ring section.

8. In a hydraulic transmission device comprising a rotary member having a radially extending flange, a plurality of vanes drivingly associated with said rotary member, each vane having a flange extending around the radially inner edge of the vane and having a section of a core ring integrally formed therewith, and the vane flange having a portion extending outward toward the core ring and serving as a baffle.

9. In a hydraulic transmission device, in combination, a rotary hub member, and a semicircular vane drivingly associated with said rotary hub member, said vane comprising a stamping having integrally formed flanges respectively on its radial straight edge and its radially inner curved edge, one of said vane flanges defining a core ring section and extending outwardly along the straight edge of the vane to serve as a baffle.

REINHOLD C. ZEIDLER.

REFERENCES CITED

The following references are of record in the file of this patent:

UNITED STATES PATENTS

| Number | Name | Date |
|---|---|---|
| 2,115,895 | Weihmann | May 3, 1938 |
| 2,264,002 | Neracher et al. | Nov. 25, 1941 |
| 2,327,647 | Jandasek | Aug. 24, 1943 |